United States Patent [19]
Dickinson et al.

[11] Patent Number: 5,665,972
[45] Date of Patent: Sep. 9, 1997

[54] METHOD AND APPARATUS FOR MONITORING CONTAMINATION

[75] Inventors: Jeffrey W. Dickinson, Loveland, Colo.; Charles G. Hudson, Chattanooga, Tenn.; Daniel S. Johnson, Larimer, Colo.; Richard McGinley, Ocala, Fla.; Richard J. Sexton, Boulder, Colo.

[73] Assignee: Westinghouse Electric Corporation, Pittsburgh, Pa.

[21] Appl. No.: 581,664

[22] Filed: Dec. 29, 1995

[51] Int. Cl.$^6$ ................ G01T 1/169; G01T 1/11
[52] U.S. Cl. .............. 250/394; 250/252.1; 250/266; 250/337
[58] Field of Search ................ 250/394, 337, 250/266, 252.1 R

[56] References Cited

U.S. PATENT DOCUMENTS

| | | | |
|---|---|---|---|
| 4,378,498 | 3/1983 | Givens | 250/252.1 |
| 4,757,201 | 7/1988 | Kanter | 250/337 |
| 5,025,158 | 6/1991 | Veronesi et al. | 250/328 |
| 5,371,363 | 12/1994 | Lilimpakis | 250/253 |

*Primary Examiner*—Constantine Hannaher

[57] ABSTRACT

A method for measuring the fixed contamination level in a confined area such as small diameter pipe. The method measures the accumulated detection response over a given area and prescribed time period. To obtain the measurement a plurality of sensors are connected in tandem to form a flexible detector string and remotely positioned within the area to be monitored. The measurement is correlated to a standard obtained by using a known source in a simulated mockup environment. In one embodiment a passive monitor such as a Thermo-Luminescence Dosimeter is employed as the sensor.

34 Claims, 4 Drawing Sheets

1

METHOD AND APPARATUS FOR MONITORING CONTAMINATION

CROSS REFERENCE TO RELATED APPLICATIONS

This application is related to application Ser. No. 08/581,663, Docket No. WE58905, entitled Method and Apparatus for Remotely Positioning An End-Effector Within And Guiding It Through A Conduit, which is filed contemporaneous herewith and assigned to a common assignee.

FIELD OF THE INVENTION

This invention relates generally to methods for monitoring fixed levels of contamination, and more particularly to methods for monitoring an accumulated detection response for a prescribed time period over a selected surface area in a confined environment.

BACKGROUND OF THE INVENTION

In the remediation of facilities that had been used for the processing, storage or activation of nuclear materials, it is often difficult or too expensive to remove and dispose of all of the contaminated components. The desired approach is to decontaminate the materials to a greenfield condition so that they can remain on site, or to at least a low level radioactive waste criteria to reduce the cost of disposal off site. For the purpose of this discussion a greenfield condition is a term used to identify an acceptable level of radiation that will permit a facility or component member to be released for unrestricted applications. Many of these facilities, e.g., nuclear power electrical generating facilities, have a large number of inaccessible components, such as system process and drain piping that are often deeply embedded in concrete. The decontamination process becomes particularly difficult under such circumstances when the piping has small diameters measuring two inches or less.

Copending application WE58905 describes a method for accessing and decontaminating small embedded and relatively inaccessible piping runs. A parallel problem exists in radiologically mapping or surveying these type of surfaces once they have been decontaminated to assure that any residual radioactive contamination is within acceptable levels. Accessibility is one of the issues that can be addressed by the methods described in the foregoing patent application. However, there are still other issues that have to be over come because the prior art sensors used for this purpose are generally not configured to access these type of areas, i.e., being capable of being drawn through small diameter clearances or traverse U-traps and elbow bends, due to their size or configuration. Also the degree of sensitivity of the prior art sensors has been an issue because of the small absolute values of radioactive contamination to be measured due to the size of the areas to be monitored. These types of problems are not necessarily unique to nuclear facilities, but are in a number of respects common among facilities experiencing other forms of contamination, e.g. chemical processing facilities.

Accordingly, it is an object of this invention to provide a method of monitoring that can provide an integrated reading that will confirm the greenfield status of remediated surface areas in confined locations. It is also an object of this invention to achieve that with a sensor that is capable of scaling sharp bends and U-traps in small diameter piping of 5.08 cm (two inches) or less.

SUMMARY OF THE INVENTION

In one embodiment this invention provides a method for measuring the radiation emitted over a given area per unit of time and in its preferred embodiment it measures the radiation emitted in a confined area such as the interior of small diameter piping.

In accordance with the invention, a plurality of radiation detectors connected together in tandem on a flexible string are inserted into the area to be measured and left in place for a specified period of time before being withdrawn and the measurement noted. In one embodiment, second detector assembly, similar to the first, is inserted into a mockup of the confined area. The mockup establishes a corresponding radioactive environment using a known calibrated radiation source. The second detector assembly is left in the radioactive environment for a given period of time before being withdrawn and the measurement noted. Readings from the first and second detectors are correlated to provide a calibrated measurement per unit of area per unit of time. If exposure periods of the first and second detectors are different an appropriate correction factor is applied.

The invention has particular benefit in confined areas such as the interior of small piping having diameters measuring 5.08 cm (2 inches) or less. Passive detectors such as Thermo-Luminescence Dosimeters can be used in this way to provide enhanced sensitivity. Benefit can also be obtained from employing Geiger-Mueller (GM) probes housed in a unique spherical-like containers that are strung together with flexible connectors and appropriately spaced to enable the string to traverse difficult pipe bends.

BRIEF DESCRIPTION OF THE DRAWINGS

FIG. 5b is a cross sectional view of the detector housing of FIG. 5a;

FIG. 5c is a top view of the detector housing of FIG. 5a;

DESCRIPTION OF THE PREFERRED EMBODIMENT

Figure 1:
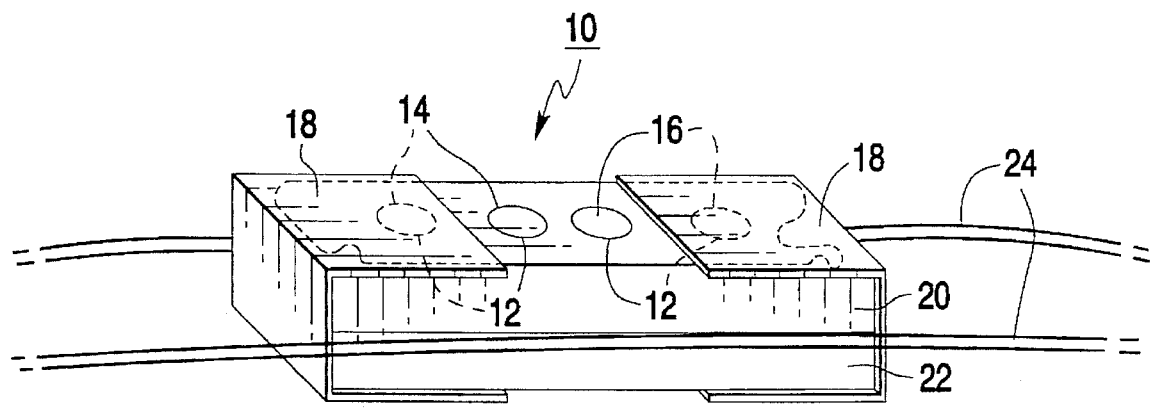
FIG. 1 is a schematic view of a back-to-back TLD sensor arrangement of this invention.

In decommissioning radioactive facilities the surveying methodology is an important and adjunct part of the decontamination process. A facility cannot be released for other uncontrolled applications without verification of its greenfield condition. Surveying is the process that is used to monitor the residual contamination that may remain after the decontamination processes have been carried out. Patent application WE 58905 identifies the difficulty in carrying out decontamination techniques in the confined inaccessible areas often encountered in these facilities. The problems are even more acute for the surveying process, because of the need to verify extremely low levels of contamination and because in many cases existing technologies are not suited to transcend the tortuous paths often encountered in the small diameter piping runs employed in many subsystems, e.g., the drainage systems.

Assessment of internal contamination in piping is most easily accomplished by using real-time measuring instruments (e.g., GM or cylindrical gas flow probes). However, when dealing with piping embedded in concrete, situations are often encountered where use of conventional equipment is not practical (and in some cases not possible). This is especially true for small diameter embedded piping, e.g., $\leq 5.08$ cm (2"), having multiple bends. In these situations, in accordance with the preferred embodiment of this invention applied to measuring radiation exposure, surface contamination levels on the inside of piping can be measured by using strings of Thermo-Luminescent Dosimeters or TLDs. In accordance with this invention, TLDs are calibrated by determining the TLDs' reported dose from a known 100 cm$^2$ source. Subsequently, the dose measured by TLDs while in the system piping is related to the surface contamination level (dpm/100 cm$^2$).

The radiation dose measured by TLDs in the system piping is defined by this invention differently than heretofore and is not intended to be equivalent to other similar values previously obtained in connection with the use of TLDs in their prior art application to monitoring personnel exposure (e.g., shallow-dose or lens of the eye dose). Rather, the dose, as used in regard to this invention to measure piping contamination, is more directly analogous to direct real time methods of measuring contamination (e.g., a direct measurement of contamination with a gas flow proportional detector or Geiger-Mueller probe using the difference between a shielded and unshielded reading), even though TLDs are passive devices. This is a new application for TLDs and has not been previously addressed by any industry guide or standard. The terms passive or passive device are used in this discussion to refer to a class of detectors having a component element or material that is physically altered by exposure to the measured contamination in a manner that is dependent on the level of contamination monitored, and in a way that can be subsequently analyzed to determine the level of exposure. In this sense a TLD or activated charcoal detector can be considered a passive device. Active or active devices are terms used in this discussion to refer to a detector that provides a real time output representative of the monitored contamination.

To survey a given pipe segment in accordance with this embodiment, a TLD string is constructed with a sufficient number of TLDs that are appropriately spaced and centered in the pipe to achieve the desired survey coverage of the internal pipe surfaces. The positioning methodology described in patent application WE58905 can be used to locate the TLD string at the targeted location. The number of TLDs to be employed in tandem in a detector string is dependent on the length of the segment to be monitored and the spacing between TLDs is a function of their sensitivity for the particular environment being surveyed. After installing the string in the pipe and waiting a designated exposure period to obtain statistically significant reported values, the TLDs are removed and processed, and the reading is related to a contamination level at each survey location. The data analysis performed includes the steps of: determining the TLD string average and 95% confidence contamination level for the data obtained from the pipe segment surveyed; and determining the sensitivity, i.e., the MDA (Minimum Detectable Activity) for the pipe considering location specific background and exposure period. Calibration is achieved by correlating the reading of the surveying sensor to that of a substantially identical sensor that had been exposed to a known source in a comparable environment, preferably in parallel with the survey.

The TLD strings can be constructed with Panasonic Type 802 TLDs (without element holder or hanger) which use thin elements that are good beta detectors. The Panasonic Type 802 TLD 10, shown in FIG. 1 is a four element 12 TLD with two elements each of Lithium Borate ($Li_2B_4O_7$:Cu) 14 and Calcium Sulfate ($CaSO_4$:Tm) 16. Both element types exhibit slow fading characteristics with Lithium Borate rated at <10%/month and Calcium Sulfate at approximately 3%/month. Fading can be compensated for by exposing the calibration TLDs during the period that surveying TLDs are in system piping. Thus, the average fade period for TLDs in piping is approximately the same as the average fade time of the calibration TLDs whose results are averaged to determine the calibration factors. In this example element types are placed adjacent each other. For instance, the first two elements are Lithium Borate 14 and the second two are Calcium Sulfate 16 in this example. The greater the TLD density per sensor the larger the area that can be monitored in less time.

Figure 2:
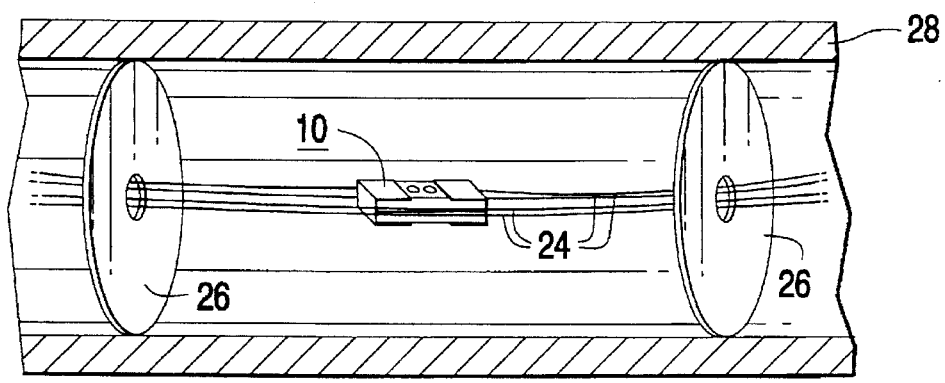
FIG. 2 is a schematic view of the sensor arrangement of FIG. 1 centered in a pipe.

To distinguish between beta and gamma dose to the TLD, the TLD insert is used without its holder and is supplied with a specialized shielding arrangement 18. In this example, 300 mg/cm$^2$ shield of aluminum (approximately 0.044" thick) 18 is applied to the outer elements (i.e., one of each type). Therefore, the difference between the unshielded element (which actually contains about 14 mg/cm$^2$ of plastic shielding that contain the TLD elements) and shielded element of each phosphor type provides an indication of the beta dose to the TLD 10. The thickness and makeup of the shielding will be dependent upon the average energy, of the contamination in the piping. With each of the element types measuring beta contamination, two independent indications of possible contamination are produced at each survey location. When attaching TLDs to the string, two TLDs 20 and 22 are used back-to-back at each survey location on the string 24, which is centered in the pipe, to provide maximum angular coverage at a given location as shown in FIGS. 1 and 2. Back-to-back construction of TLDs on the string minimizes exposure to light and thus potential fading induced by fluorescent lighting once the TLD strings are removed from system piping. As shown in FIG. 1, shielding 18 is applied jointly to both TLDs 20 and 22 to ease the construction process.

FIG. 2 illustrates the construction of the TLD string with centering discs and TLDs attached. Centering of the TLDs 10 in the pipe segments to be surveyed is accomplished by using discs 26 of a diameter slightly smaller than the inside diameter of the pipe 28. Discs 26 are desirably located 20" apart with TLDs 10 attached half-way between adjacent discs 26 as shown in FIG. 2. To provide adequate strength, 1/16" cables 24, connected by 1/8" round ferrules, not shown, are used for the string. When the TLD string is installed in the System piping, the string is pulled taut and secured to ensure that each TLD is suspended in the center of the pipe. A two-strand cable 24 is used to allow a more precise centering of the TLDs in the pipe without interfering with the TLDs ability to measure beta radiation.

In this embodiment survey coverage is accomplished with TLD strings by spacing survey locations, i.e., TLDs, 50.8 cm (20") apart for both 2.54 cm (1") and 5.08 cm (2") diameter piping surveys. The TLD readings are related to a 100 cm² area by calibration. The TLD effective range in this application enables them to accurately measure a 100 cm² area. For 1"-piping, the pair of TLDs at a location collectively measure the 100 cm² area around them, i.e., their measured doses are summed and related to the 100 cm² area. This is done to enhance measurement efficiency of a 100 cm² area in 1" diameter piping. For 5.08 cm (2")-piping, each TLD is defined to measure the beta dose from its own adjacent 100 cm² area (i.e., 200 cm² are measured by a TLD pair). Therefore, because 20" of 1" diameter piping contains 400 cm² of internal surface and 20" of 5.08 cm (2") diameter piping contains 800 cm of surface area, the 20" spacing between TLD pairs maybe used with both piping sizes to accomplish 25% coverage. Increasing or decreasing survey coverage may be accomplished by decreasing or increasing the TLD spacing, respectively.

Calibration Methodology

Figure 3:
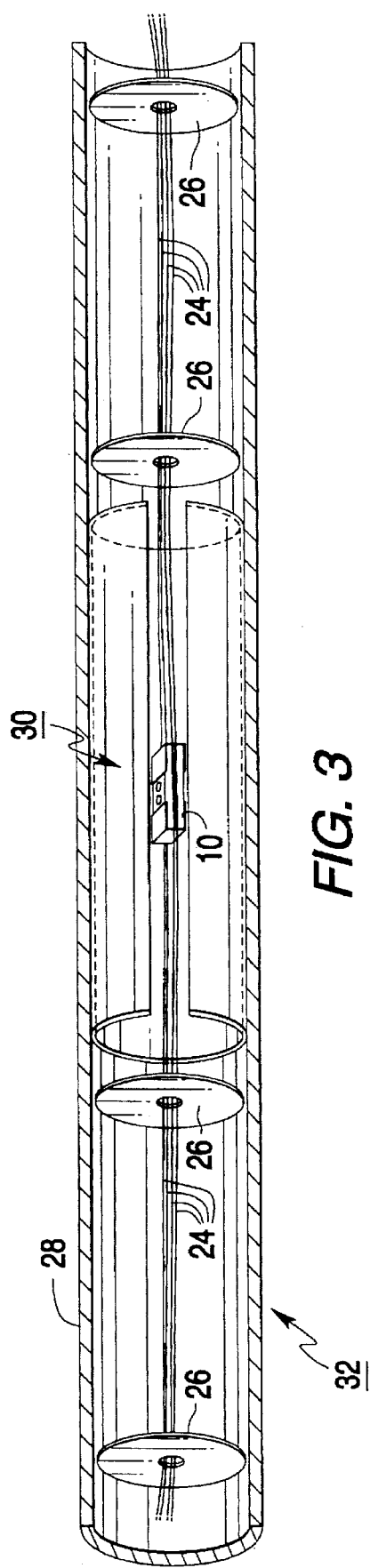
FIG. 3 is a schematic view of the sensor arrangement of FIG. 2 center in a one inch pipe jig mockup, illustrating the calibrated source configuration of this invention.

Calibration is accomplished by exposing a set of TLDs 10 to a known activity, for example Tc-99 in a specific geometry, e.g., centered in a 2.54 cm (1") diameter pipe as shown in FIG. 3. The net signal, i.e., unshielded element reading minus shielded element reading, is due to radiation emissions that could not penetrate the 300 mg/cm² aluminum filter 18 shown in FIG. 1; therefore, these emissions could not have originated outside the pipe 28 which is a much thicker shield. Consequently, beta back-ground is assumed to be zero during both calibration and surveying. Because all beta exposure will be assumed to originate from the calibration source or system piping, care has to be taken when handling the TLDS outside of that environment, to prevent beta contamination. Additionally, "control" TLDs are kept with string TLDs, except during calibration or when in the system piping, to identify any additional beta exposure to TLDs, should it occur.

In an application to surveying decontaminated piping from a nuclear powered electrical generating station, the TLDs are calibrated to a pure beta emitter because the primary radiation decay mode of expected "detectable" system contamination will produce beta radiation. Any other radiation types that may be encountered, i.e., emissions that do not penetrate the beta shielding 18 (since those that penetrate the shielding are accounted for in the background subtraction), will likely yield an over-response in one but not both of the TLD elements and be detectable. For example, if a high degree of x-ray or low energy gamma radiation is present it would be indicated by the difference between the shielded and unshielded Lithium Borate and Calcium Sulfate readings. This is due to the physical characteristics of the Calcium Sulfate phosphors which exhibit an over-response to low energy gamma as compared to Lithium Borate by as much as a factor of 15. Absent such other types of radiation the different element types should exhibit substantially the same reading. Experimental results have shown that such differences in the readings of the two elements is not likely to be experienced in applications involving the decontamination of nuclear power generating facilities.

Figure 4:
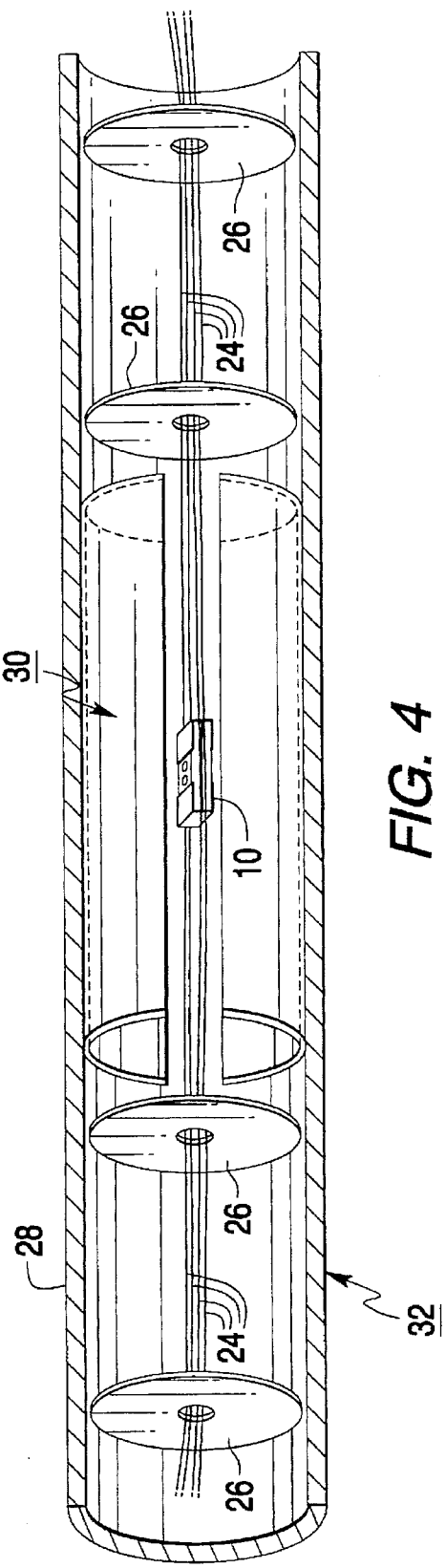
FIG. 4 is a schematic view of the jig mockup of FIG. 3, illustrating the calibrated source configuration for a two inch pipe.

Although it is generally expected that system contamination will be uniformly distributed, the affect of localized contamination is addressed by using a 100 cm² source 30, shown in FIGS. 3 and 4. Using a 100 cm² source to calibrate the TLDs, in effect, assumes that the TLD's measured beta dose came from the 100 cm² area surrounding it. Any additional beta dose that originates outside of the defined 100 cm², would yield a higher and more conservative result. However, localized contamination outside the monitored zone for a given sensor is not likely to have much affect due to the rapidly diminished sensitivity of the TLD outside the defined area.

Calibration is accomplished employing a jig 32, which is an uncontaminated piece of pipe identical to the pipes that are to be surveyed containing a calibration source. String cables 24 and centering discs 26 are also used to center and suspend TLDs in the calibration jig 32 in the same manner as was done in the surveyed pipe, as shown in FIGS. 3 and 4. In this way, the same geometry and scattering affects are achieved during calibration as are experienced inside the system piping.

It should be noted the TLD being calibrated need not remain in the jig for the same time as the TLD string remains in the pipe being surveyed. The TLD reading is linear with time and a proportional factor can be used to correct for any time difference. It is also not necessary that the survey and calibration process occur at the same time, except if fading is an issue in any given application. It is also possible to use the same TLD that is used in the survey process, for calibration in the jig.

The value of a calibration factor is mathematically determined by dividing the number of disintegrations the TLD was exposed to (i.e., dpm/100 cm² of source multiplied by irradiation time in minutes) by the indicated beta dose (mR*). The Average Calibration Factor (dis/100 cm²/mR*) is the average result determined from the set of TLDs exposed to the calibration source. This factor is determined independently for each element type (i.e., Lithium Borate and Calcium Sulfate). Since TLDs of the preferred embodiment use two different element types, the results from both calibration and piping exposures are treated separately for each element type (i.e., Lithium Borate and Calcium Sulfate). This allows characteristic statistics of each to be analyzed separately. Alternatively, single element TLDs may be used, though not preferred. Once each element type reading is correlated to a contamination level by its Average Calibration Factor, then results may be combined to improve accuracy and precision of the overall result.

To ensure an accurate Average Calibration Factor is determined for each element type, a sufficient number of calibration tests are conducted such that uncertainty of the Average Calibration Factor is $\leq 20\%$ (at 95% confidence level). The Average Calibration Factor uncertainty is calculated from the following equation:

$$95\% \text{ Confidence Interval} = \frac{t_{0.95,N-1} * SD}{\sqrt{N}}$$

where

N is the number of calibration tests, $t_{0.95,N-1}$ is Student's t for 95% confidence and N−1 degrees of freedom, and SD is the sample standard deviation of the sample set.

Experimental results have shown a level of uncertainty, at 95% confidence, of the Average Calibration Factors determined during embedded pipe testing, which included 12 calibration tests, ranged from about 8 to 11%. Testing has also shown that the Panasonic Type 802 TLDs are linear over a wide range. Linear ranges for each element type are 3E-3 to 500 Rad for $LiB_2O_7$:Cu, and <2E-4 to 300 Rad for $CaSO_4$:Tm.

The quantity mR* is the Panasonic reader corrected value provided by a commercial service, e.g., ICN Dosimetry Service of Irvine, Calif., after the TLD is processed and background has been subtracted, i.e., data are corrected for each element's individual correction factor but not processed with an algorithm. Corrected mR* readings provide a standardized basis so that comparisons between individual TLDs can be made while allowing specialized data analysis to be performed as provided for herein.

The contamination level measured at a given survey location of the TLD string is determined from the beta dose to the TLDs. To determine the beta dose, the net reading from the TLD is used for each element type, i.e., element 2 minus element 1 for Lithium Borate and element 3 minus element 4 for Calcium Sulfate. The net reading for each element type is then corrected by its Average Calibration Factor to determine a contamination level (dpm/100 cm$^2$). The overall contamination level for the location is then the dependent reading type dependent readings.

The above analysis is as described for 5.08 cm (2") piping TLDs where each TLD is defined to measure its own defined 100 cm$^2$ area. For 2.54 cm (1") piping TLDs, however, two (2) TLDs at a given survey location collectively monitor the defined 100 cm$^2$ area around them. Therefore, TLD readings for the corresponding elements of the two TLDs are first respectively summed (element 1 plus element 1, element 2 plus element 2, etc.) with the sum for each pair of elements used as described in the preceding paragraph.

The contamination level associated with each element type of a given TLD is determined by multiplying the net reading by its Average Calibration Factor. For example, consider a TLD left exposed within the system piping for 80,000 minutes and assume its Lithium Borate elements report a net reading of 30 mR*. If the Average Calibration Factor for Lithium Borate (for a given pipe size) was 6.5E6 dis/100 cm$^2$/mR*, then the associated contamination level would be equal to 2.4 kdpm/100 cm$^2$ as shown below:

$$\frac{(6.5E6 \ dis/100 \ cm^2/mR^*)(30 \ mR^*)}{(80,000 \ min)} = 2.4 \ (kdpm/100 \ cm^2)$$

This type of calculation is performed for both element types with the average contamination level used as the measurement for the corresponding TLD location.

For a set of measurements taken, e.g., a set of measurements in a given pipe segment or measurements from a set of pipes of a given survey unit, the average contamination level is determined by the following equation:

$$\bar{X} = \frac{\sum_{1}^{N} X_i}{N}$$

where $X_i$ is the value of the ith measurement (or TLD location), and

N is the total number of measurements.

To determine the acceptability of a pipe or survey unit's average contamination level, uncertainty of the average value must be determined. To perform this determination, the sample standard deviation (SD) of the set of measurements taken, is calculated. The equation used to calculate the standard deviation is as follows:

$$SD = \sqrt{\frac{\sum_{1}^{N}(X_i - \bar{X})^2}{N-1}}$$

Uncertainty of the average contamination level is then determined for 95% confidence by using Student's t equation as previously shown:

$$95\% \ \text{Confidence Interval} = \frac{t_{0.95,N-1} * SD}{\sqrt{N}}$$

Upon adding the uncertainty to the average value, an upper limit is then obtained which represents (with 95% confidence) the maximum value of the average contamination level of the pipe or survey unit.

To ensure a TLD string is in a given pipe segment for a sufficient period of time, a Minimum Detectable Activity (MDA) level is determined. In particular, in one working example determined by the U.S. Nuclear Regulatory Commission, the MDA was required to be ≦75% of the SGLV (Site Specific Guideline Value). Factors that affect MDA, in addition to the exposure period, include the Average Calibration Factor and measurement statistics.

The MDA equation for general survey measurements is as follows:

$$MDA \ (dpm/100 \ cm^2) = \frac{\frac{2.71}{t_s} + 3.29\sqrt{\frac{R_b}{t_s} + \frac{R_b}{t_b}}}{(\text{Efficiency})\left(\frac{A}{100}\right)}$$

where $t_s$ is the sample count time (min), $t_b$ is the background count time (min), $R_b$ is the background count rate (cpm), A is the area of detection in cm$^2$, and 3.29 is two times the one-sided 95% confidence factor 1.645.

For TLD strings, A is equal to 100 cm$^2$ by calibration, and sample and background count times are equal (henceforth called $t_s$). Therefore, the above equation is reduced to:

$$MDA \ (dpm/100 \ cm^2) = \frac{\frac{2.71}{t_s} + 2*\sqrt{2}*1.645\sqrt{\frac{R_b}{t_s}}}{\text{Efficiency}}$$

The 2.71 in the MDA equation is associated with a finite number of counts. To appropriately include this value in the MDA equation would require using raw data (i.e., the number of counts related to the TLD's response) which is not provided by the TLD vendor. Nonetheless, it is assumed that this value is negligible in comparison to the variation, i.e., standard deviation of the background element readings, of the total number of "counts" that are observed when the TLDs are read; therefore, the first term is omitted.

The square root term of the equation is in fact the standard deviation of the background (in terms of count rate). By substituting this term with the sample standard deviation of the absolute background measurements, moving count time to the denominator, and substituting efficiency with its reciprocal, i.e., the Average Calibration Factor that also includes the factor that converts the TLD reader "counts" to a reported mR* value, the MDA equation becomes:

$$MDA \text{ (dpm/100 cm}^2) = \frac{(\text{Calibration Factor}) * 2 * \sqrt{2} * 1.645 * SD}{t_s}$$

Now, the 1.645 factor assumes that the standard deviation of the measurement, is well defined (as is the case when measuring counts from radioactive decay where the standard deviation of N counts is equal to $N^{1/2}$). However, since the standard deviation for a given background measurement, i.e., element 1 or 4 reading, is inferred from the set of measurements taken for a given pipe segment, the 95% Student's t value for the number of measurements taken (actually the degrees of freedom) is substituted for 1.645.

Following the foregoing analysis, the equation for MDA is reduced to:

$MDA \text{ (dpm/100 cm}^2) =$ $$\frac{(\text{Calibration Factor}) * 2 * \sqrt{2} * (\text{Student's } t) * SD}{t_s}$$

This equation is used to determine the MDA for a given Average Calibration Factor, background standard deviation, and exposure period ($t_s$). MDA is determined separately for both element types, i.e., for both Lithium Borate and Calcium Sulfate. The lowest calculated MDA between the two is considered the MDA for the TLD's location. In other words, if one element type measures a result above its critical level and the other measures a result below its critical level, the decision "detected" is rendered.

The critical level mentioned in the preceding paragraph is the reference value for determining which, if any, results are an indication of "detected" radioactivity at 95% confidence ("detected" radioactivity means there is 95% confidence that there is radioactivity present at the location, i.e., there is a 5% chance that the result is a background fluctuation). The equation used to calculate the critical level is derived by the same argument that was used with the MDA equation and can be shown to yield:

Critical Level (dpm/100 cm²) =

$$\frac{(\text{Calibration Factor}) * \sqrt{2} * (\text{Student's } t) * SD}{t_s}$$

The critical level is calculated for reference purposes only. The acceptability of data in regard to a given pipe or collection of pipes is determined by the following criteria.

To determine if a given pipe or collection of pipes is acceptable for unrestricted use, the average contamination level plus 95% confidence interval (one-sided) is compared to the SGLV. Mathematically stated, the average contamination level of a given pipe or collection of pipes is acceptable if the following is true:

$$\overline{X} + \frac{t_{0.95,N-1} * SD}{\sqrt{N}} \leq SGLV$$

In addition to meeting the above average contamination level limit, each individual measurement may not be greater than a prescribed multiple, e.g. 3, times the SGLV as designated in the final survey plan.

Figure 5A:
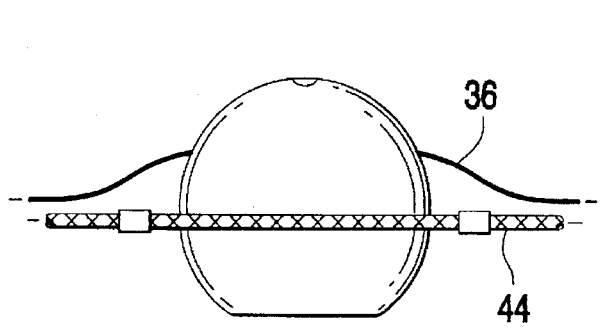
FIG. 5a is a perspective view of one side of a detector housing for one embodiment of this invention.
Figure 5B:
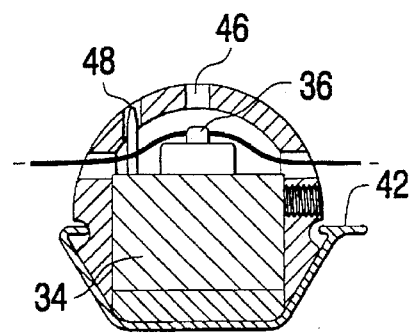
Figure 5C:
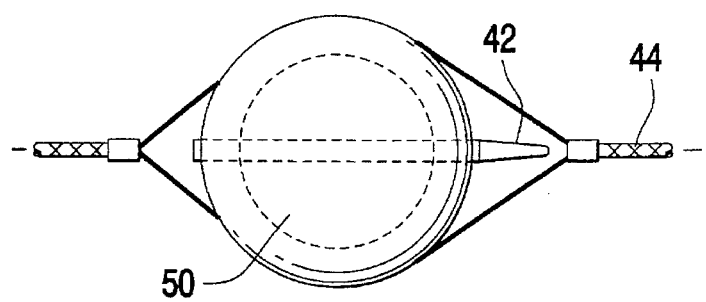
Figure 6:
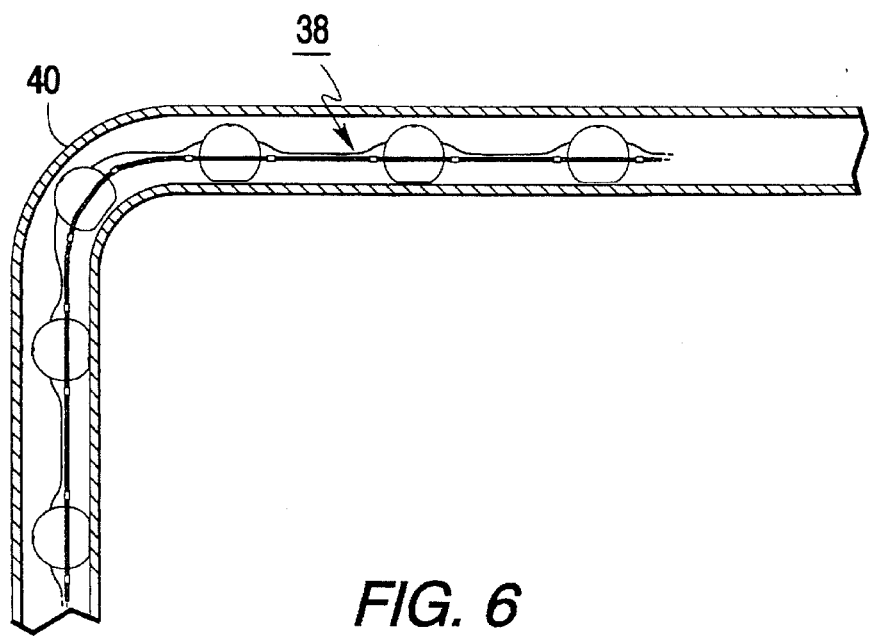
FIG. 6 is a perspective view, shown partially in cut-away, of a chain of GM Detectors, illustrated in FIG. 5, deployed through a pipe bend.

Another embodiment of the flexible detector string assembly of this invention employs active detectors that are encapsulated in spherical-like housings and strung together with flexible cable. The spacing of the detectors is dependent upon the size of the diameter of the pipe and is gauged to enable the housings to easily traverse pipe bends while keeping the detectors substantially centered along the pipe axis. A six detector chain in accordance with this embodiment is illustrated in FIG. 6 and various views of the detector within a housing is illustrated in FIGS. 5a, 5b and 5c. While spherical housings have been found to work best in traversing tortuous paths in small diameter piping, spherical-like housings, i.e., housings having circular cross sections, though they maybe somewhat axially oblong in shape, will work so long as its axial dimension does not greatly exceed the diameter of the pipe. The diameter of the housing is chosen so that it is close enough to the diameter of the pipe to keep the detector a fixed distance from the pipe wall and small enough to readily traverse the narrowest pipe bend.

A few off-the-shelf models of Geiger-Mueller detector tubes, sold as replacement sensor for commercial probes can be used in small piping to measure exposure per unit area as an alternative to the TLDs if their outputs are summed in accordance with this invention. The detector 34 illustrated in FIGS. 5a, 5b and 5c is a Geiger-Mueller tube which is enclosed housing 50 having a circular cross section and a slightly oblong profile. The detector in this example has a 0.5 inch effective detection diameter with a long side mount electrical connector 36. A round, rather than oblong, detector housing in FIG. 6. The housings 50 are at times referred to as beads because of their spherical-like shape, are designed to slide freely around the elbows 40 and are desirably constructed from a self lubricating brass. The contact angles of the bead detectors are important in that a steep angle would allow the assembly to cant and jam, while a shallow angle would not rock sufficiently, when connected in a string, to move around the elbow. The connection between beads can be accomplished using spring clips 42, shown in FIGS. 5b and 5c which lock into a groove in the beads. Desirably, the clip arrangement configures successive detectors 90° azimuthally to increase angular coverage. The rocking action of the clips significantly contributes to enabling the assembly to move around 90° elbows. The outside end clips are connected to pull cables for movement through the pipe. The access port 46, glass evacuation tube 48, and teflon back-ground shield for each detector is shown in FIG. 5b. In one example each detector housing covers an area of 1.27 cm² and the total area of the assembly 38 being 5.1 cm². This type of GM detector can be used in much the same way as the TLDs, though an active detector. However, the TLD's have the advantage of more easily accommodating tight quarters and tortuous paths.

Figure 7:
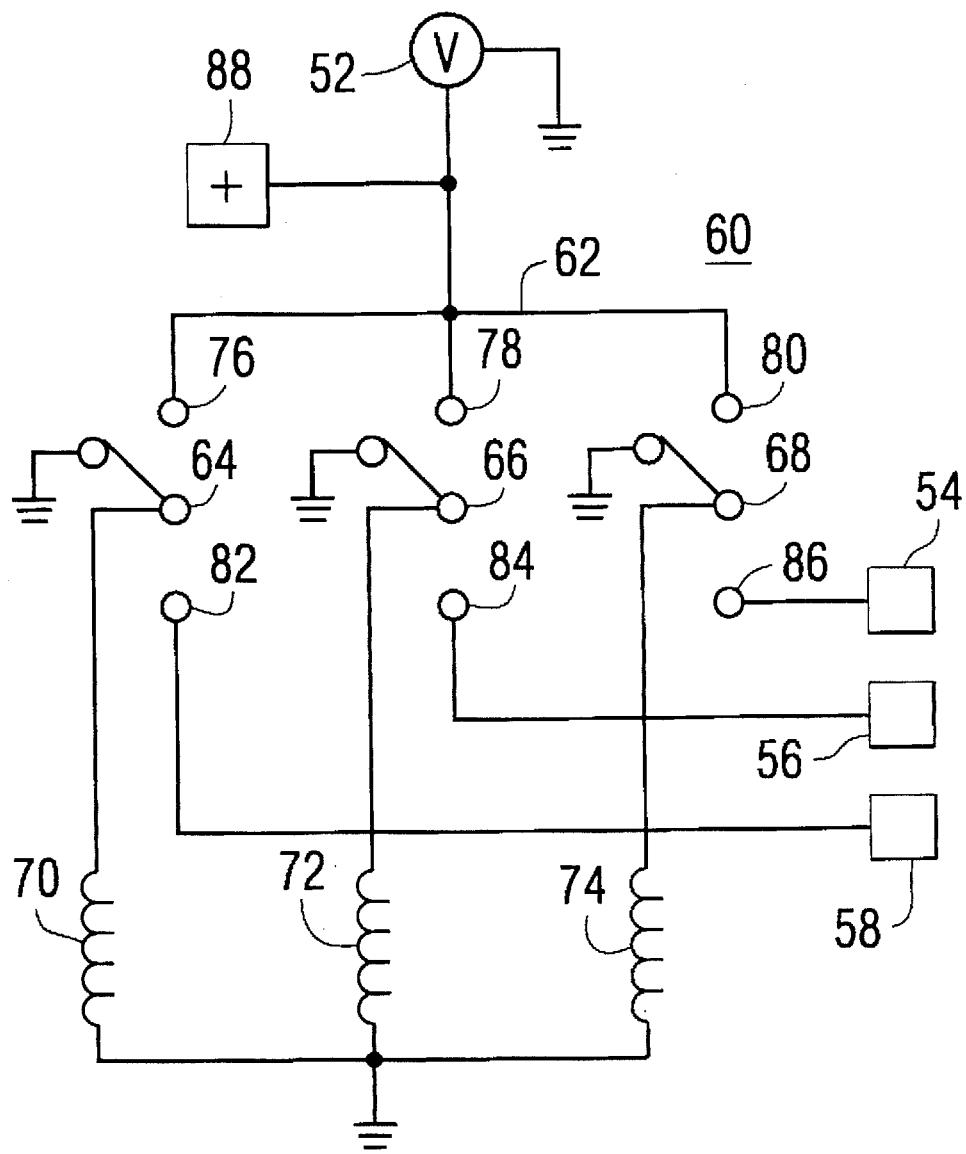
FIG. 7 is an electrical schematic of summing circuit used to connect the outputs of the detectors of one embodiment of this invention to its measurement counter.

The outputs 36 of the individual Geiger-Mueller detectors in the detector string 38 are fed through a coaxial connector to a summing box 60 shown in FIG. 7. The schematic shown in FIG. 7 shows three such detectors, 70, 72, and 74, though it should be appreciated that the circuit can be readily expanded to cover any number of detectors. The detector switches 64, 66 and 68 are respectively connected to their corresponding terminals 76, 78 and 80 to obtain a summed output at the counter 52. Alternatively, the detectors can be read individually by being connected to the corresponding terminals 82, 84 and 86, which are coupled through connections 54, 56, and 58 to separate counters. It should be appreciated that any combination of those connections can be made so that some of the detectors are summed while others are read separately. This is extremely helpful in determining whether a contamination reading is due to a hot spot or evenly distributed over the monitored area. The combined output 52 can then be connected to a divider circuit 88 to provide an average output reading.

Thus, in its broadest sense this invention provides a flexible detector string assembly and method for measuring a contaminated environment in a confined inaccessible area by obtaining an accumulated reading over a given area for a set period of time. Comparison to a standard increases the quality of the readings obtained especially when the standard is obtained using substantially identical detectors that were irradiated in a corresponding controlled environment. While the foregoing embodiments were described in an application for monitoring radioactive contamination it should be appreciated that this invention can be employed for monitoring other forms of contamination, e.g., oil with other sensors, e.g., activated charcoal.

What is claimed is:

1. A method for measuring the level of contamination in a given inaccessible monitored area to approximately background levels, per unit of time, comprising the steps of:

sizing a plurality of detectors, which are responsive to measure the contamination to be monitored to background levels, to fit within and readily move through the monitored area;

coupling the plurality of detectors in tandem, a fixed distance from each other, sized to enable the detectors to traverse approximately 90° bends inside a tubular conduit, with a flexible coupling to form a detector string that enables the detector assemblies to rock with respect to each other as they traverse the bends;

inserting the detector string within the monitored area;

leaving the detector string within the area for a specified period of time; and reading the accumulated measurement monitored from the detectors.

2. The method of claim 1 including the step of centering the detector string within the monitored area.

3. The method of claim 1 wherein the monitored area is the interior of a conduit including the step of pulling the detector string through the conduit to a location within the monitored area.

4. The method of claim 1 including the step of summing the outputs from at least two of the detectors to provide an accumulated detector reading over the combined area.

5. The method of claim 4 including the step of dividing the combined detector output by the number of detectors to provide an average reading per detector.

6. The method of claim 4 wherein each sensor is a TLD having more than one type of radiation monitoring element, wherein the summing step sums the measurements from the corresponding elements.

7. The method of claim 1 including the steps of:

creating a simulation of the given area by placing a known calibration contaminated source within a corresponding uncontaminated environment in a manner that, aside from the level of radiation, substantially simulates the environment being monitored and accommodates a first detector of the type used in the detector string;

inserting the first detector within the simulated environment for a given period of time;

reading the accumulated measurement monitored from the first detector; and correlating the measurement of the first detector with one of the detector string detectors to establish a calibrated measurement per unit of area per unit of time.

8. The method of claim 7 wherein the first detector is one of the plurality of detectors.

9. The method of claim 7 wherein the first detector and the plurality of detectors are exposed to the contamination at the same time.

10. The method of claim 7 wherein the first detector is identical to the detectors in the detector string.

11. The method of claim 7 wherein the first detector are TLDs.

12. The method of claim 1 wherein the plurality of detectors comprise passive sensors.

13. The method of claim 12 for monitoring radioactive contamination wherein the detectors are Thermo-Luminescence Dosimeters.

14. The method of claim 1 wherein the detectors comprise active sensors.

15. The method of claim 14 for measuring radioactive contamination wherein the detectors comprise Geiger-Mueller sensor tubes.

16. The method of claim 15 wherein the Geiger-Mueller tubes are enclosed in a substantially spherical-like housing.

17. The method of claim 16 wherein the housing is spherical.

18. The method of claim 1 wherein the monitored area is the interior of a conduit having its nominal cross sectional dimension 5.08 cm (two inches) or less, but greater than the nominal cross-section of the detectors.

19. The method of claim 1 wherein the detectors are gas flow radiation monitoring sensors.

20. The method of claim 1 for measuring the radiation over a given area within the interior of an irradiated conduit, per unit of time wherein the detector is a TLD.

21. The method of claim 1 wherein each detector assembly has no mechanically movable parts.

22. Apparatus for measuring contamination at approximately background levels in a given inaccessible monitored area, per unit of time, comprising:

a plurality of detectors, which are individually responsive to measure the contamination to be monitored; and flexible connectors for connecting the detectors together in tandem a fixed given distance from each other to form a flexible detector string that enables the detector assemblies to rock with respect to each other.

23. The apparatus of claim 22 for measuring contamination within a conduit including a device for centering the detectors within the conduit.

24. The apparatus of claim 23 wherein the device for centering the detectors is a circular disk supported in its center by the flexible connector.

25. The apparatus of claim 23 wherein the device for centering the detectors is a housing surrounding and supporting each detector, which is shaped to conform closely with the interior shape of the conduit and sized to pass through the conduits narrowest dimension.

26. The apparatus of claim 25 wherein the housing is spherical-like in shape.

27. The apparatus of claim 22 wherein the detectors provide real time electrical outputs corresponding to the level of contamination monitored including a summing circuit for summing at least two of the plurality of detector outputs.

28. The apparatus of claim 27 wherein the summing circuit is programmable to sum selected outputs from the plurality of detectors while providing individual output readings of the other detectors.

29. The apparatus of claim 28 for monitoring contamination in a conduit wherein the spacing between detectors is guaged to enable the detectors to be pulled around conduit bends without jamming.

30. The apparatus of claim 29 wherein the spacing between detectors is a function of each detectors range and the interior dimension of the conduit.

31. A method for measuring the contamination in a given monitored area to approximately background levels, per unit of time, comprising the steps of:

inserting a first passive detector, sized to fit within the monitored area;

leaving the first detector within the area for a specified period of time;

withdrawing the first detector from the area after the specified period of time;

reading the accumulated measurement monitored from the first detector;

creating a simulation of the given area by placing a known calibrated contamination source within a corresponding uncontaminated environment in a manner that, aside from the level of contamination, substantially simulates the environment being monitored and accommodates a second detector;

inserting the second detector within the simulated environment for a set period of time;

reading the accumulated measurement monitored from the second detector;

correlating the measurement of the first and second detectors to establish a calibrated contamination measurement per unit of area per unit of time.

32. The radiation measurement method of claim 31 wherein the first detector is inserted into the monitored area and the second detector is inserted into the simulated environment at the same time.

33. The radiation measurement method of claim 31 wherein the first and second detectors are substantially identical.

34. The radiation measurement method of claim 31 sensors connected in tandem.

* * * * *